United States Patent
Arcuri et al.

(10) Patent No.: US 6,232,972 B1
(45) Date of Patent: May 15, 2001

(54) METHOD FOR DYNAMICALLY DISPLAYING CONTROLS IN A TOOLBAR DISPLAY BASED ON CONTROL USAGE

(75) Inventors: Michael P. Arcuri, Seattle; Tjeerd Hoek, Kirkland; Jeffrey J. Johnson, Bellevue; Martijn E. Van Tilburg, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/098,787

(22) Filed: Jun. 17, 1998

(51) Int. Cl.[7] ..................................... G06F 13/00
(52) U.S. Cl. ............................. 345/352; 345/348
(58) Field of Search .................... 345/339, 352, 345/348, 349, 333, 334, 353, 354, 146

(56) References Cited

U.S. PATENT DOCUMENTS

| | | |
|---|---|---|
| 4,680,729 | 7/1987 | Steinhart . |
| 4,692,858 | 9/1987 | Redford et al. . |
| 5,041,967 | 8/1991 | Ephrath et al. . |
| 5,115,501 | 5/1992 | Kerr . |
| 5,220,675 | 6/1993 | Padawer et al. . |
| 5,261,042 | 11/1993 | Brandt . |
| 5,287,514 | 2/1994 | Gram . |
| 5,465,358 | 11/1995 | Harvey et al. . |
| 5,644,737 * | 7/1997 | Tuniman et al. .................. 345/352 |
| 5,644,739 * | 7/1997 | Moursund ......................... 345/354 |
| 5,726,688 | 3/1998 | Siefert et al. ..................... 345/352 |
| 5,760,768 | 6/1998 | Gram . |
| 5,825,357 * | 10/1998 | Malamud et al. ................. 345/340 |
| 5,867,162 * | 2/1999 | O'Leary et al. .................. 345/352 |
| 5,897,670 | 4/1999 | Nielsen ............................ 345/334 |

OTHER PUBLICATIONS

SYBEX Inc. Microsoft Excel, chapter 1, Fig 1.3, 1997.*
"Intelligent Tool Tracker/Display IBM Technical Disclosure Bulletin", vol. 37, No. 2A Feb. 1994 p. 175.
Steve Harris, et al. "Inside WordPerfect 6 for Windows", New Riders Publishing, p. 1063, 1994.
"Suitable Icon" IBM Technical Disclosure Bulletin, vol. 39, No. 11, pp. 63–64, 1996.
*Microsoft® Works Reference*, Appendix E: Macros, ©Copyright Microsoft Corporation 1987, 1988, 1989, pp. 369–382.
*Microsoft Word User's Guide*, Version 5.0, ©Copyright 1991–1992 Microsoft Corporation, pp. 61–66.

* cited by examiner

Primary Examiner—Raymond J. Bayerl
Assistant Examiner—Tadesse Hailu
(74) Attorney, Agent, or Firm—Kilpatrick Stockton LLP

(57) ABSTRACT

Displaying controls in a toolbar display based on the control's usage. A toolbar displays controls, including a special control for accessing a drop-off well display for those controls not fitting into the toolbar display. A Most Recently Used parameter is associated with each control and is determined by the user's selection of individual controls. When the user selects a control from the drop-off well display, the Most Recently Used parameter associated with the selected control is updated to indicate that it is the control that has been used most recently. Preferably, the toolbar display attempts to expand to incorporate the selected control. If the toolbar display can be expanded, then the selected control is added to the toolbar display and placed in the toolbar displayed in a predefined relational order. If the toolbar display cannot be expanded, then a calculation is performed to determine which controls to display in the toolbar and which controls to place in the drop-off well display. This calculation is based on the Most Recently Used parameter and the display size of the associated control. Only those most recently used controls will be displayed in the toolbar display and the remaining controls will be placed in the drop-off well display.

28 Claims, 7 Drawing Sheets

METHOD FOR DYNAMICALLY DISPLAYING CONTROLS IN A TOOLBAR DISPLAY BASED ON CONTROL USAGE

FIELD OF THE INVENTION

The present invention relates to graphical user interface systems and, more particularly, to dynamically changing the controls displayed in a toolbar display based on usage of the controls.

BACKGROUND

Graphical user interface (GUI) systems present information to the user in a graphical format using windows, toolbar displays, icons, and graphics. One of the goals of GUI systems is to present information needed by the user in a pleasant and apparent manner so that the user is more inclined to utilize the functions of the underlying software without having to memorize many commands. For example, to move the location of a file using a GUI system, a user may only have to select a file and then drag it to the desired folder or other location. The user is not required to remember any text commands but is performing an activity, e.g., moving a file, by performing a natural or familiar function, e.g., selecting the file and moving it to the preferred destination.

As software becomes more complex and provides more functionality, the design of a GUI becomes increasingly more difficult for software developers. Typically, this additional complexity and functionality results in the presentation of more commands to the user so that the user can take advantage of the additional functionality. In general, the goal of designing a GUI is to present commands to the user that are useful without being confusing. When the number of commands to be presented to the user increases, it becomes more difficult to present commands in a user-friendly interface without overwhelming the user with multiple layers of buttons, menus and graphics.

Software designers have addressed this problem by creating menus and toolbar displays in the GUI that can comprise multiple commands or control items in a minimal amount of display area, thereby increasing the density of the commands easily available to the user. Menus present commands in a pull-down fashion allowing multiple command access from a single point on the display. Toolbars contain controls, which are typically displayed on toolbar displays constantly on a screen for easy access. Because toolbar displays are, generally, permanently displayed on the screen, the controls in the toolbar are, ideally, those controls used most often by the user. For example, a toolbar display in a word processing application may present Character Style controls (e.g., Bold, Italics and Underline) of the corresponding toolbar because these style attributes are used often during a word processing session. Usually, however, the determination of which controls are most important is done by software designers—not the users—in anticipation of possible user needs.

The utilization of toolbar displays has created a dilemma for software designers. There are many commands that are often used by the user but designers are constrained to limited toolbar display space. The toolbar display space is limited because displaying too many controls will cut into the workspace display area for the application. In addition, placing too many controls in front of the user becomes confusing, counteracting the goal of the GUI.

There have been several approaches for addressing the problem of presenting too many commands to a user on a toolbar display. One approach merely truncates the toolbar display on the right side of the display where it runs out of display space. Controls in the truncated area are just not accessible to the user. The user cannot access the truncated area of the toolbar display unless the toolbar display size is increased (i.e., such as by increasing the window size).

Another approach allows multiple toolbar displays to share display space in a window, thereby maximizing the amount of workspace display while still giving users access to the commands contained in the toolbar display. Because the toolbar displays share space, their display area is reduce thereby reducing the number of controls that can be displayed at any one time. Controls not displayed in the toolbar display can be accessed by using a special control item, which allows the user to page through the available controls for the corresponding toolbar on the toolbar display. However, when a user wishes to use a control that is not displayed, the user is required to page through the available controls each time until the desired control is displayed and then select it. This may require the user to constantly page through the toolbar display to access the controls, independent of when or how often the control is used.

A third approach does not allow multiple toolbar displays to share display space; however, this approach allows for the assignment of priorities to the various controls. When the toolbar display cannot display all of the available controls, the controls that are displayed are based on the assigned priority. However, this assigned priority is independent of the user's usage of the control. The priority is static and assigned to the controls by software developers and may only be altered through the use of a Visual Basic program, which most users are not sophisticated enough to perform.

And finally, several applications modify which controls are in the toolbar display based on a particular state the application is in or on what object is selected. The intent is to display the controls thought to be of value to the user. The determination of what is displayed in the toolbar is again dictated by the application or software designer, not the user.

Therefore, there is a need in the art for a method to display controls in a toolbar display that are most important to the user, based on the user's usage of the controls, while maximizing the available workspace in a window for use by the application. The method also will display the most important controls to the user, which may change dynamically throughout a session, and provide access to all the controls accessible through the toolbar display.

SUMMARY OF THE INVENTION

The present invention satisfies the above-described needs by providing a method to display controls in the toolbar display that are most important to the user while maximizing the available workspace in a window for the application. The present invention can track control usage to determine which controls to display in the toolbar display, to expand or reduce the toolbar display size when sharing display space with other toolbar displays and to provide access to the controls not displayed in the toolbar display, typically through a special control in the toolbar display.

The advantage of tracking the usage of controls is that it allows placement of the controls in the toolbar display that are most likely to be used and removal of those controls that are less likely to be used. This provides a cleaner user interface with less clutter. It also allows multiple controls to be accessible to the user without software developers having to "guess" which controls are more or less important to the user during the development phase. The user, in essence, "creates" his or her own toolbar display without having to program the software, merely by using it. By creating a toolbar display, the user is more likely to be satisfied with the results than if someone else designed it for them.

The present invention provides a method for a toolbar display, having a constrained display area, to display controls of a program module based on user usage of the controls in the toolbar display. The toolbar's display area may be constrained because: 1) the boundaries of the window are too small to display the entire toolbar display, or 2) multiple toolbar displays share the same display area. The present invention can determine the size of the toolbar display based on display constraints. The controls in the toolbar display can be displayed to the users based on the usage of the controls. The identification of the control and a parameter indicating when the control was most recently used, referred to as the Most Recently Used parameter, can be maintained within a data structure. The Most Recently Used parameter is a relational parameter that indicates when the control was used in relation to the other controls accessed via the toolbar display.

At startup, the program module determines if there is a usage file containing the data structures and parameters for the controls of a toolbar display saved from the last session of the same application. If the usage file does not exist, then the program module can place controls in the toolbar display based on a predefined order. Any controls that do not fit within the toolbar display are placed in a drop-off well display. The controls contained in the drop-off well display typically are accessed through a special control in the toolbar display.

When a user selects a control, the data structure for that control is modified to indicate that the particular control is the most recently used. If the control selected is already displayed, there will be no impact to the user interface (i.e., the same controls will remain being displayed). However, if the user selects a control from the drop-off well display, the data structure for that selected control is also modified to indicate it is the most recently used, and the selected control is then added to the toolbar display. If the toolbar display is capable of expanding in size to accommodate the selected control, the toolbar display is expanded and the selected control is added to the toolbar display. A determination is then made as to which controls will fit in the toolbar display, typically based on the Most Recently Used parameter contained in the data structures of all the controls accessed via the toolbar display.

When the toolbar display is capable of being expanded, and it shares display area with another toolbar display, the second toolbar display's size is reduced by the amount of space needed by the first toolbar display to accommodate a selected control. Conversely, when a control is selected from the second toolbar display's associated drop-off well display, the first toolbar display is reduced in size to accommodate the second toolbar display's expansion to accommodate the selected control. Therefore, the presentation of toolbar displays can dynamically change based upon which controls are used by the user.

These and other advantages of the present invention may be more clearly understood and appreciated from a review of the following detailed description of the disclosed embodiments and by reference to the appended drawings and claims.

DETAILED DESCRIPTION

Figure 1:
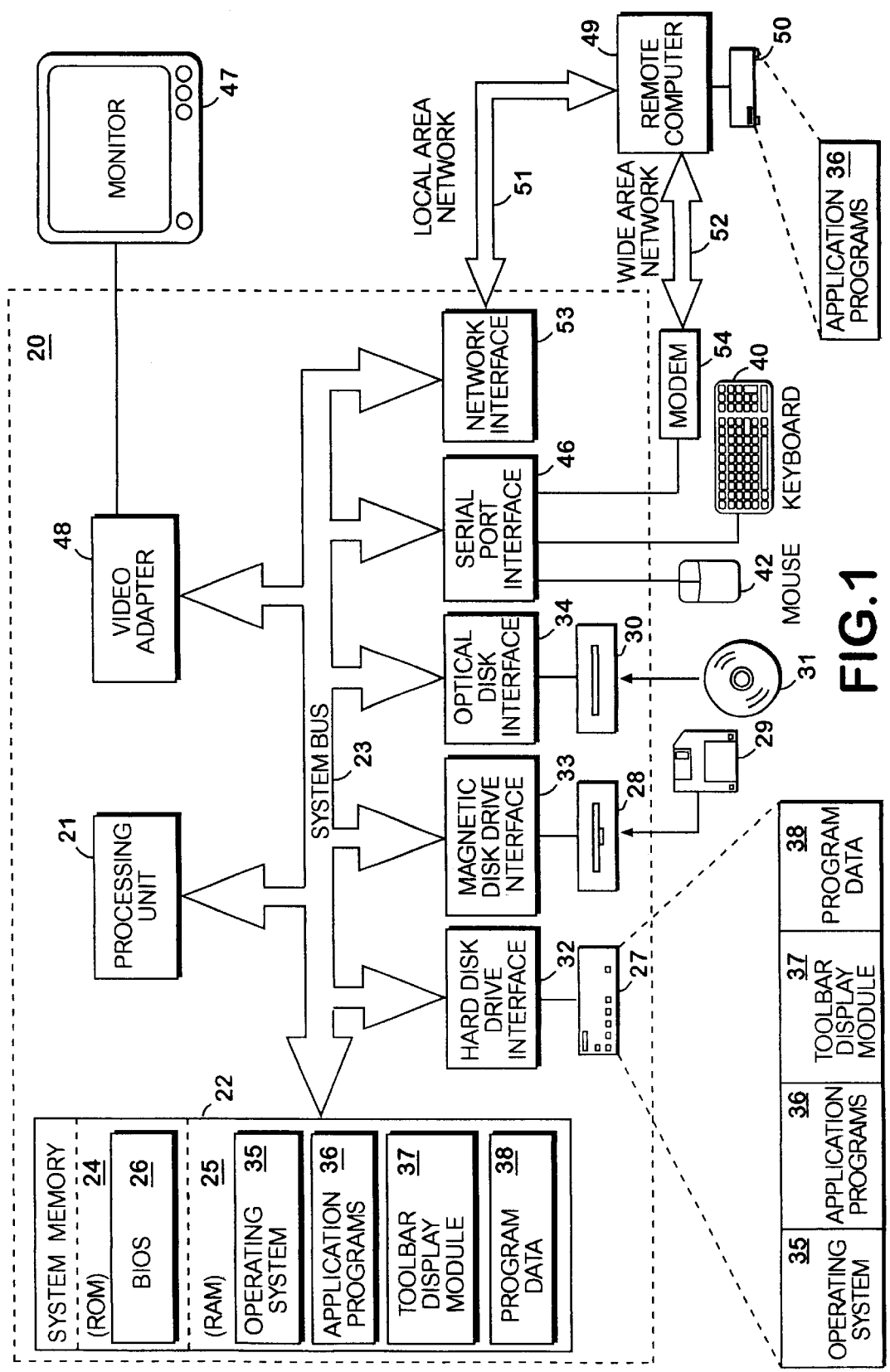
FIG. 1 is a block diagram of a personal computer that provides the operating environment for an embodiment of the present invention.

The present invention is directed toward a method for dynamically displaying controls in a toolbar display based on the usage of the controls. In one embodiment, the invention is incorporated into a suite of applications bundled together and entitled "OFFICE 2000", marketed, by Microsoft Corporation of Redmond, Wash. Briefly described, the "OFFICE 2000" application allows a user to access multiple applications while providing a consistent user interface between all the bundled applications.

The present invention provides a method, having a constrained display area, to display controls for a program module based on usage of the controls in the toolbar display. The size of the toolbar display can be determined based on these constraints. Consequently, the controls in the toolbar display can be presented based on the usage of the controls.

In support of the invention, a data structure containing parameters for the controls in the toolbar display can be maintained in computer system memory. Within the data structure, the identification of the control and a parameter, the Most Recently Used parameter, are maintained to indicate when the control was most recently used is kept. This parameter indicates when the control was used in relation to the other controls accessed via the toolbar display.

At startup, the program module, such as an application program, determines if there is a usage file containing the data structures and parameters for the controls of a toolbar display saved from the last session of the same application. If the usage file does not exist, then the program module places controls in the toolbar display based on a predefined order. Any controls that do not fit within the toolbar display can be placed in another display element, such as a drop-off well display. The controls contained in the drop-off well display are typically accessed through a special control displayed in the toolbar display.

When a user selects a control, the data structure for that control is modified to indicate that the particular control is the most recently used control. If the control selected is already displayed, there is no impact to the user interface (i.e., the same controls are displayed). However, if the user selects a control from the drop-off well display, the data structure for that selected control is modified to indicate it is the most recently used, and the selected control is then added to the toolbar display. If the toolbar display is capable of expanding in size to accommodate the selected control, the toolbar display is expanded and the selected control is added to the toolbar display. A determination can be made as to which controls fit in the toolbar display based on the Most Recently Used parameter contained in the data structures of all controls accessed via the toolbar display.

When a toolbar display is capable of being expanded, and it shares display area with another toolbar display, the second toolbar display size can be reduced by the amount of space needed by the first toolbar display to accommodate a selected control. Conversely, when a control is selected from the drop-off well display associated with the second toolbar display, the first toolbar display can be reduced in size to accommodate the second toolbar display's expansion to include the selected control.

The controls of a toolbar can have a predefined relational order within the display of that toolbar. Therefore, the order in which controls are displayed in the toolbar display preferably does not change based on the value of the Most Recently Used parameter. For example, presume three controls have the order defined as CONTROL1, CONTROL2 and CONTROL3 (i.e., display CONTROL1 to the left of CONTROL2 and CONTROL3, and display CONTROL2 to the left of CONTROL3 and to the right of CONTROL1, etc.). If space exists for only two controls and CONTROL3 has the preferred Most Recently Used value and CONTROL1 contains the next ranked Most Recently Used value, CONTROL3 and CONTROL1 are displayed in the toolbar display in their relational order, i.e., CONTROL1 to the left of CONTROL3 (and CONTROL2 is not displayed).

EXEMPLARY OPERATING ENVIRONMENT

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, the toolbar display module 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

USER INTERFACE STEPS FOR EXPANDING A TOOLBAR DISPLAY

Figure 2A:
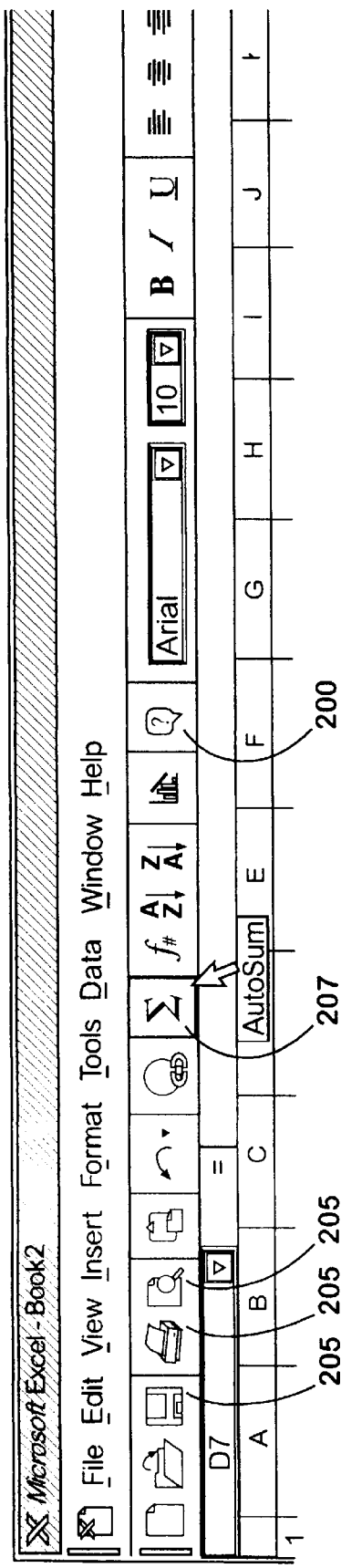
FIGS. 2a, 2b, 2c, and 2d, collectively described as FIG. 2, are graphic representations of the user interface steps for expanding a toolbar display to incorporate a control selected from a drop-off well display in accordant with an embodiment of the present invention.

FIGS. 2a–d, collectively referred to as FIG. 2, are graphic representations of the user interface steps involved with expanding a toolbar display to incorporate a control selected from a drop-off well display in an embodiment of the present invention. FIG. 2a depicts a toolbar display 200 displaying controls 205 for the corresponding toolbar. The controls 205 are typically button commands that operate to execute a given command when the associated control item is selected. Selection can be performed by moving a mouse pointer over the control and depressing the mouse button, or by accessing the control via a keyboard entry. The controls can be application-specific or commands that interact with the operating system or a browser. For example, one control of a toolbar, when selected, may be a command to save a file which requires a call to the operating system. Another control may generate a command to create a graph using utilities within the application.

FIGS. 2a–d depict a toolbar display 200 displayed in the spreadsheet application program called "Microsoft Excel" developed by Microsoft, Corporation. It will be recognized by one skilled in the art that this is only a representative example of displaying a toolbar display within an application and that the present invention is applicable to a graphical user interface display element in any type of program module, such as an application or any operating system.

FIG. 2a depicts controls 205 that are displayed based on either usage or, if this is the first time the application has been executed and no usage history exists, a predefined set established by the software designers. When the user selects a control that is already displayed in the toolbar display, such as the AutoSum Control 207, the toolbar display will not be modified. This is because, in this embodiment of the present invention, the most recently used controls are displayed. In FIG. 2a, the AutoSum Control 207 is already displayed in the toolbar display. Therefore, after its selection, it is determined to be the most recently used control. However, because it is already in the toolbar display, the controls displayed do not change.

Figure 2B:
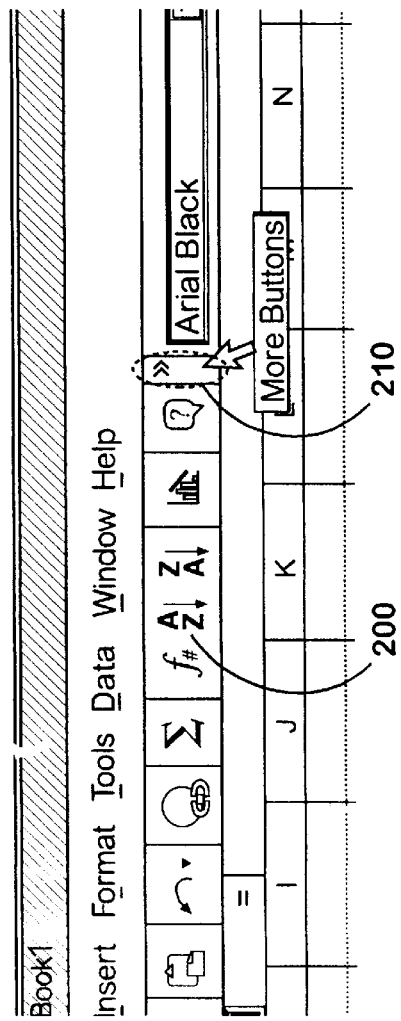

FIG. 2b depicts the user selecting the special control 210 displayed in the toolbar display 200. The special control 210 is a control that is displayed in the toolbar display 200 when additional controls that can be accessed via the toolbar display cannot fit in the display area. Because the special control serves as an access point to other controls, it may be appreciated that the value of maintaining a data structure to track its usage is minimal. In one embodiment of the present invention, the controls that are not displayed in the toolbar display 200 are those controls that are not the most recently used. When the user selects the special control 210 from the toolbar display 200, a pop-up menu will appear displaying a drop-off well display 215 (see FIG. 2c) and the controls contained within it.

Figure 2C:
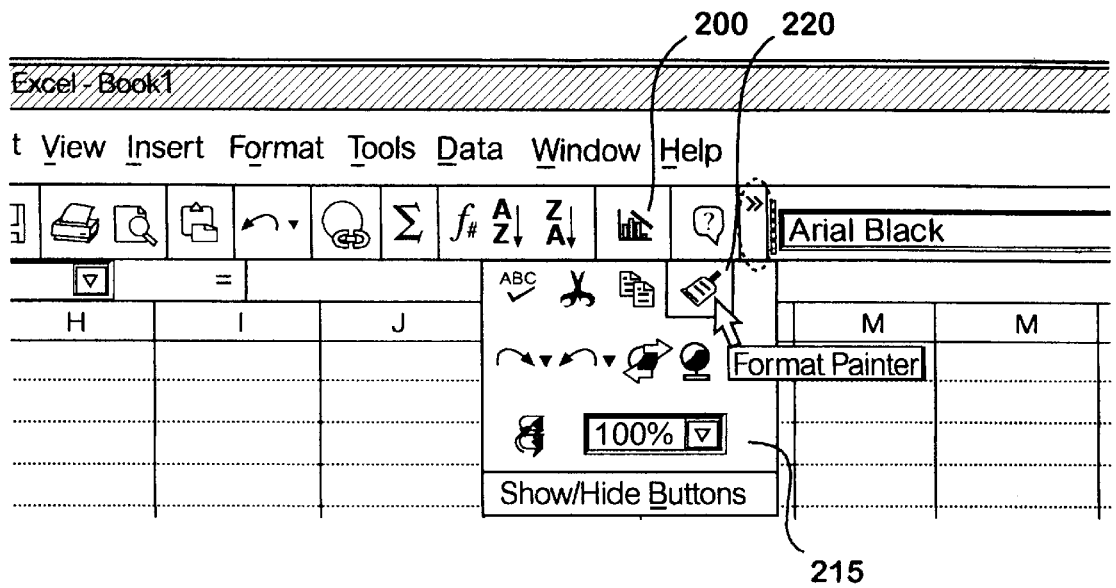

FIG. 2c depicts the drop-off well display 215 and the additional controls that could not fit in the toolbar display 200. When the user selects a control from the drop-off well display 215, for example the Format Painter Control 220, a command is issued to execute the Format Painter function. After selection of the Format Painter Control 220, the Format Painter Control 220 is set to be the most recently used control. The toolbar display 200 is then modified to display the Format Painter Control 220. Hence, the toolbar display 200 contains those controls based on user selection.

Figure 2D:
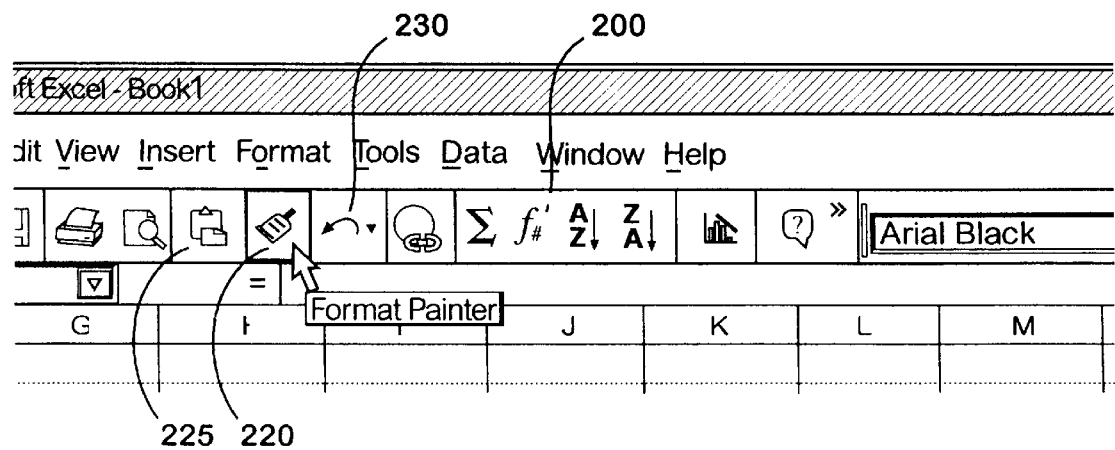

FIG. 2d depicts the new controls displayed in the toolbar display 200. The Format Painter Control 220 is now displayed in the toolbar display because it has been the most recently used control. In this case, the toolbar display was capable of being expanded, and therefore, all the other controls 205 that were displayed prior to the selection of the Format Painter Control are still displayed in toolbar display 200. The toolbar display 200 was merely expanded to accommodate the Format Painter Control 220. Note also the position of the Format Painter Control 220. The controls in toolbar display 200 are displayed in a defined relational order. The relational order position for the Format Painter Control is defined to be between the Clipboard Control 225 and the Undo Control 230. Therefore when the Format Painter Control 220 was added to the toolbar display 200, it was placed between the Clipboard Control 225 and the Undo Control 230.

DISPLAYING CONTROLS AT STARTUP

Figure 3:
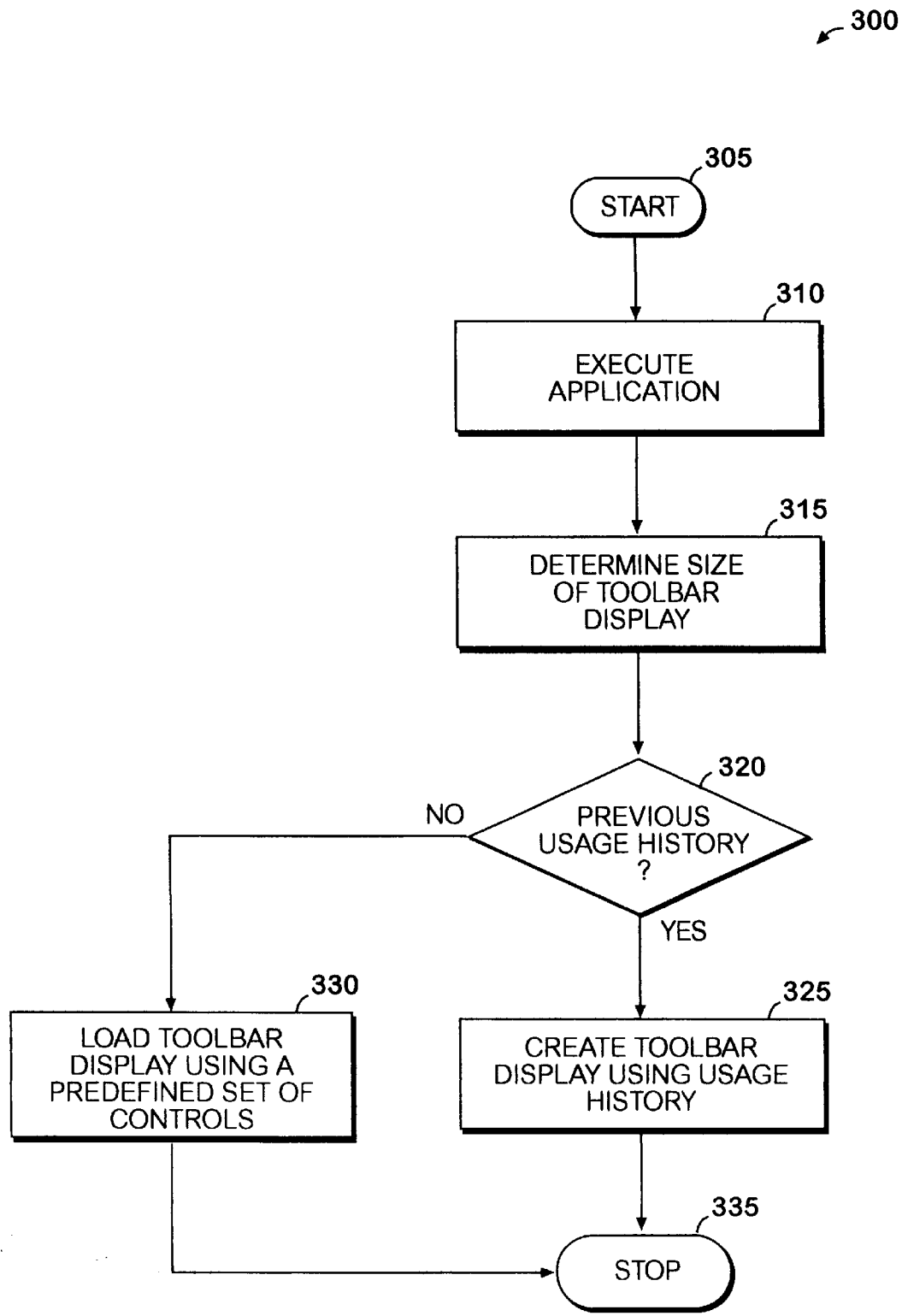
FIG. 3 is a flowchart depicting the steps for displaying controls in the toolbar display at startup of a program module in an embodiment of the present invention.

FIG. 3 is a flowchart depicting the steps for displaying controls in the toolbar display at application startup in an embodiment of the present invention. Method 300 begins at the START step 305 and proceeds to step 310 where the program module, such as an application, is executed. As described with respect to FIG. 1, the application interacts with a toolbar display module in order to display the controls for the corresponding toolbar in the toolbar display. For one embodiment of the present invention, the toolbar display module may be implemented via a dynamic link library accessible by the application. For an alternative embodiment, the toolbar display module can be placed within the executable file of the application program. Once the application is executed, method 300 then proceeds to step 315.

At step 315, the size of the toolbar display for displaying the controls is determined. The size of the toolbar display can vary based on multiple factors, including the size of the window the application will be running in, and whether there are multiple toolbar displays that share display area. Preferably, each toolbar will have a display size associated with it, which takes into account the above factors. The toolbar display size is then determined by checking the size of the toolbar display.

At step 320, a determination is made whether there exists a usage history for the currently executing application. This supports a determination of which controls to display in the toolbar display and which controls to place in another display element, such as the drop-off well display. The usage history is information indicating the user's usage of the controls displayed in the toolbar display from a previous session of the application. In the case where multiple toolbar displays share display area, this usage history may modify the size of the toolbar display determined in step 315. In one embodiment of the present invention, the usage history of the toolbar display is stored from a previous session of the same application, presuming there was a previous session of the application. In this embodiment, the stored usage information is application dependent, and therefore separate applications require separate stored usage information. This is preferable because many applications populate the toolbar display with their own controls. Furthermore, controls often used in one application may rarely be used in another. However, this is not the case for different sessions of the same application. For example, a user may use the character style controls often in a word processing program, but not in a spreadsheet program. It will be valuable to keep this information after the user ends a session with the word processing application for the next time the word processing application is used. Yet, this information provides little benefit for the spreadsheet application. Therefore, it is preferable that the stored usage information be application dependent, yet accessible for subsequent sessions of the same application.

If there is no previous usage history for this application, method 300 proceeds to step 330 and the controls displayed in the toolbar display are determined by a predefined usage or a historical usage pattern. This step will occur when the application is executed for the first time or when the application has been executed, but none of the controls were used. The method 300 then proceeds to step 335 and stops.

If a previous usage history exists, method 300 proceeds to step 325 where controls are displayed in the toolbar display based on the information in the previous usage history. The user will see the toolbar display as he or she left it when the application was exited from the previous session. The method 300 then proceeds to step 335 and stops.

METHOD FOR DISPLAYING CONTROLS IN A TOOLBAR DISPLAY

Figure 4:
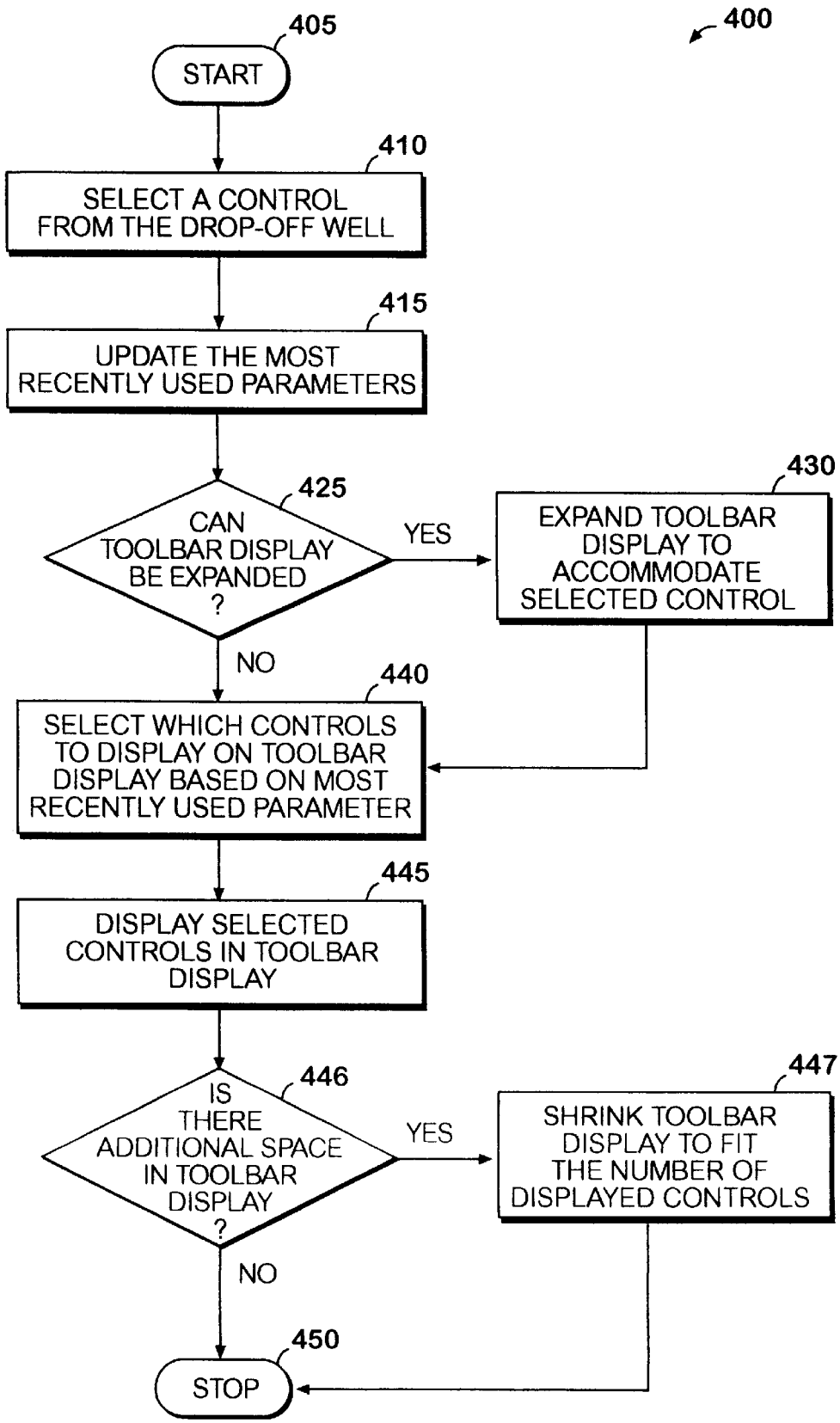
FIG. 4 is a flowchart depicting the steps for displaying a control, selected from a drop-off well display, in a toolbar display in accordance with an embodiment of the present invention.

FIG. 4 is a flowchart depicting the steps for displaying a control, selected from a drop-off well display associated with a toolbar display, in an embodiment of the present invention. The method 400 begins at the START step 405. Proceeding to step 410, a selection is made from the drop-off well display. In this embodiment, the selection is performed by the user accessing the drop-off well display by selecting a special control in the toolbar display. Upon selecting the special control, the controls contained in the drop-off well display are displayed. The user then can use a mouse pointer to select a control from the drop-off well display. Alternatively, the user can perform their selection task by use of the keyboard. The fact that the control is contained in the drop-off well display signifies that its Most Recently Used parameter was not low enough to place it in the toolbar display. A lower value for the Most Recently Used parameter indicates that the associated control has been used more recently than a control with a higher value for the Most Recently Used parameter value. While it is preferable that the Most Recently Used parameter be used to determine which controls to display, one skilled in the art will recognize that other usage algorithms exist, such as a Most Often Used parameter. The decision of which usage parameters, or combination of parameters, to use is an implementation choice and considered within the scope of the present invention.

At step 415, the Most Recently Used parameters for all applicable controls are updated. The Most Recently Used parameter is preferably implemented using a numeric system. The lowest value will represent that the associated control is the most recently used control, i.e., it was the last control selected by the user. In a representative example involving a toolbar having at least fifteen controls, the Most Recently Used parameter for each of the controls will be a value in the range between one and fifteen, inclusive. When a control is selected, its Most Recently Used parameter is assigned the value of one indicating that it is the most recently used control. All of the controls having a Most Recently Used parameter higher then the selected controls previous value are incremented. For example, if a control, having a Most Recently Used parameter value of 6 is selected by a user. Its Most Recently Used parameter is then assigned a value of 1, and all of the other controls having a Most Recently Used parameter of less then 6 (i.e., 1–5) have their Most Recently Used parameter incremented by 1. This method of maintaining the Most Recently Used parameter allows for the least amount of storage space required in the data structure to maintain the Most Recently Used value by ensuring that no gaps exist in the Most Recently Used values.

In this embodiment, the selected control is assigned a value of 1 to indicate that the selected control has been used more recently than any other control accessed via the toolbar display. Because the previously selected control will also have a value of 1 for its Most Recently Used parameter, it, as well as any other controls having Most Recently Used parameters less than the value of the Most Recently Used parameter of the selected control prior to its selection, must also be updated.

Following the updating of the Most Recently Used parameters for those controls, method 400 proceeds to step 425 to check whether the toolbar display can be expanded. This embodiment of the present invention places the most recently used controls in the display. If the toolbar display having the drop-off well display can be expanded to accommodate the selected control, then it is preferable to expand the toolbar display and add the selected control to the display. If the toolbar display cannot be expanded, then a recalculation of how many controls will fit in the toolbar display, based on the updated Most Recently Used parameter values, must be performed.

An attempt is made in this exemplary embodiment to keep a toolbar display at its maximum size but several factors may decrease the size of the toolbar display. If the window containing the toolbar display is less then the toolbar display's maximum width or if the toolbar display shares space with other toolbar displays, the toolbar display is forced to reduce its size. In step 425, the determination of whether the toolbar display can be expanded includes checking the window size to determine if it can accommodate the selected control or, more likely, that the toolbar display is sharing display area with another toolbar display and can expand into the display area.

If the determination is made in step 425 that the toolbar display is capable of expanding, then method 400 proceeds to step 430 where the toolbar display is expanded in the display to accommodate the selected control.

Whether or not the toolbar display can be expanded to accommodate the selected control in step 425, this embodiment of the present invention then determines a new set of controls in the toolbar display based on the Most Recently Used parameter associated with all the controls. To perform this, the method 400 proceeds to step 440 where controls are selected to be displayed in the toolbar display based on the Most Recently Used parameters of all the controls in the toolbar display. The selection is performed by starting with the control having the lowest Most Recently Used parameter value (signifying that it is the control that was used most recently). This control will require a certain amount of display space in the toolbar display. The next most recently used control is examined to determine if it will also fit in the toolbar display. This exemplary embodiment continues down the Most Recently Used parameters for the controls, accumulating the space required for each individual control until it gets to the control that will not fit. The controls selected to be displayed in the toolbar display are those controls having a Most Recently Used value less then the control that would not fit into the toolbar display. Again, because the special control's function is to access other controls, it is preferable that it is always displayed.

As stated above, one embodiment of the present invention requires that the selected control be displayed maintaining its predefined relational order with the other displayed controls. It is preferable that this predefined relational order be maintained to maintain visual continuity with the user. The user may come to expect that when a control appears in the toolbar display, that it appears after or before other specific controls. This user expectation increases the overall user efficiency of the toolbar display by not requiring the user to hunt through the toolbar display to find a specific control. If the user has a sense of where the control would be displayed in the toolbar display, based on other controls in the toolbar display, the user will more quickly pick out the location of the control in the toolbar display. Or, in the case where the control is contained in the drop-off well display, the user will be able to quickly determine that the control is not in the toolbar display and therefore the user knows that he or she must open up the drop-off well display to find the desired control.

At step 445, the selected controls are displayed in the toolbar display. All other controls will be placed in the drop-off well display, accessible via the toolbar display through the special control located on the toolbar display. It will be recognized that the other controls not displayed in the toolbar can be accessed, stored and displayed in many ways. While this embodiment includes the use of a special control and a drop-off well to access, store and display these other controls, it is considered within the scope of the present invention that other access, storage, and display methods used to interact with the controls not displayed in the toolbar are within the scope of the present invention.

Proceeding to step 446, the toolbar display area is examined to determine if there is additional space in the toolbar not used for a control. After displaying the selected controls in the toolbar, the possibility exists that there is some leftover display space that isn't enough to contain another control. To account for this, the present invention checks for any leftover display space in step 446, and if this space exists, then proceeds to step 447 where the toolbar display size is reduced to fit the number of display controls. Following step 447 or if no leftover space was found in step 446, the method 400 proceeds to step 450 where it stops.

USER INTERFACE STEPS WHEN MULTIPLE TOOLBAR DISPLAYS EXIST

Figure 5A:
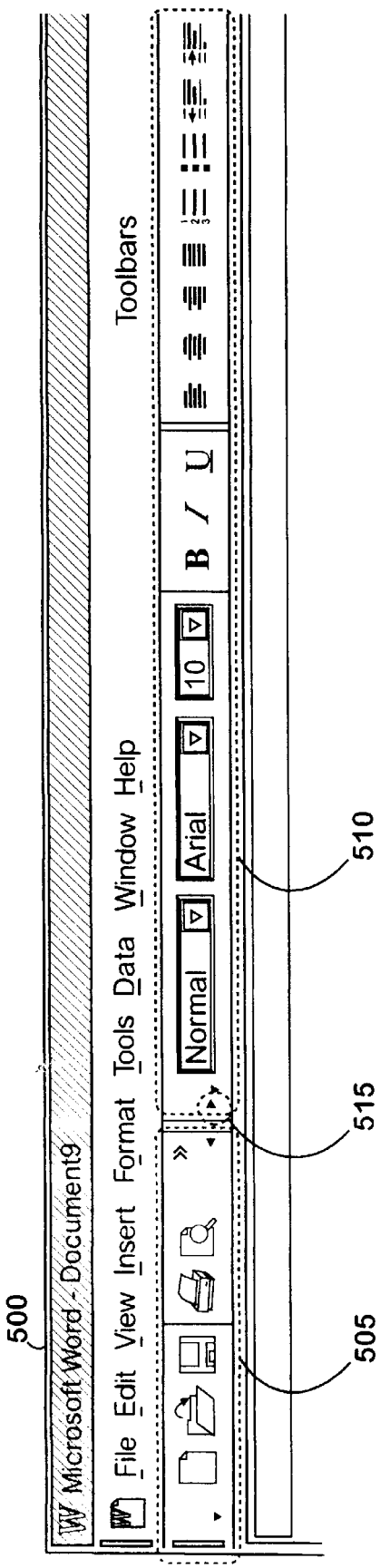
FIGS. 5a–b, collectively referred to as FIG. 5, are graphic representations illustrating the user interface steps for expanding a toolbar display via a slide control in an embodiment of the present invention.
Figure 5B:
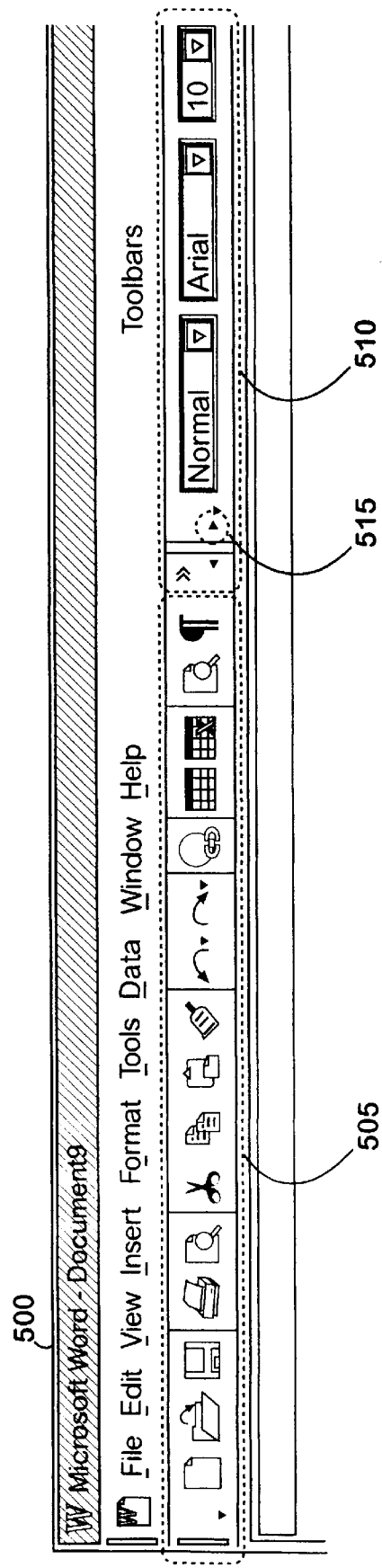

FIG. 5*a–b*, collectively described as FIG. 5, are graphic representations illustrating the user interface steps involved with expanding a toolbar display via a slide control in an embodiment of the present invention. FIG. 5*a* depicts two toolbar displays 505, 510 and a slide control 515. The slide control 515 is used to change the amount of display space allocated to the two toolbar displays 505 and 510. In one embodiment of the present invention, when multiple toolbar displays share display space, each toolbar display will expand and contract based on the usage within each toolbar display. It is possible that one toolbar display will expand significantly leaving only a couple of controls displayed in the other toolbar display. FIG. 5*a* depicts such an event, where the toolbar display 510 utilizes approximately three-fourths of the display space and the other toolbar display 505 only utilizes about one-fourth of the display space. If the user decides to adjust the amount of space allocated to each toolbar display 505 and 510, an exemplary embodiment provides a slide control 515 for this purpose. The user selects the slide control 515 and drags it either to the right to give toolbar display 505 more display space (and toolbar display 510 less display space) or to the left to allocate even less space to toolbar display 505 (and more display space to toolbar display 510).

FIG. 5*b* depicts the result of dragging the slide control 515 to the right. The amount of display space allocated to the toolbar display 505 has increased and the amount of display space allocated to toolbar display 510 has decreased. Notice that when the toolbar display 505 is decreased or increased, the number of controls displayed in the toolbar display is changed. As expected, the more display space allocated to a toolbar display allows for more controls to be displayed. Consequently, the less space allocated to the toolbar display will decrease the number of controls that can be displayed.

METHOD FOR DISPLAYING CONTROLS IN MULTIPLE TOOLBARS

Figure 6:
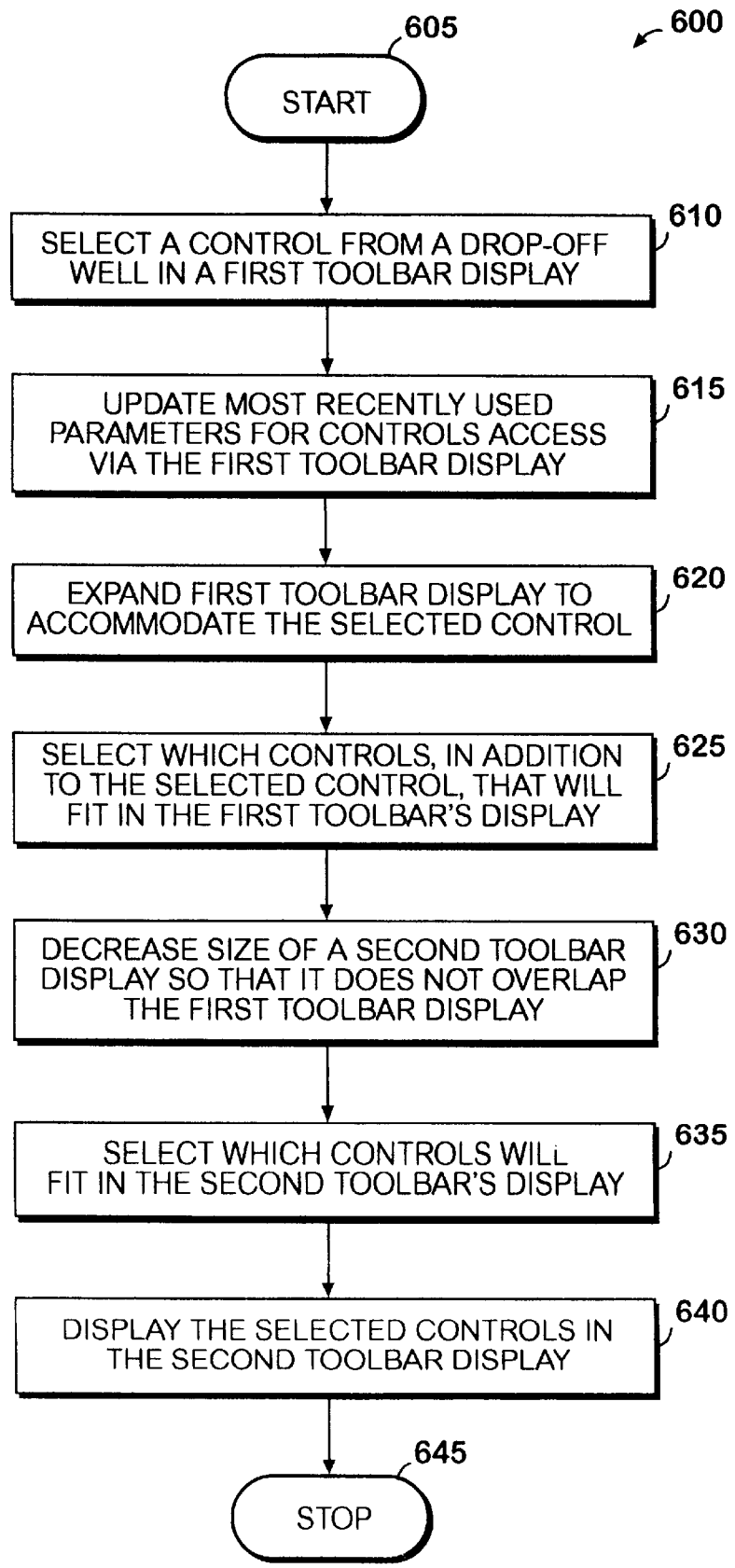
FIG. 6 is a flowchart depicting the steps for expanding one toolbar display, while reducing the size of another toolbar display, by selecting a control from a drop-off well display, in accordance with an embodiment of the present invention.

FIG. 6 is a flowchart depicting the steps involved in expanding one toolbar display, while reducing another toolbar display, by selecting a control from the drop-off well display, in an embodiment of the present invention. This embodiment of the present invention allows multiple toolbar displays to share display area. Each of the multiple toolbar displays will usually, but not necessarily, comprise a unique set of controls. Because the toolbar displays share display area, often times all the controls defined to a toolbar display are not capable of being displayed. Each toolbar display will have a drop-off well display to display those controls that are not capable of being displayed in that toolbar display. Each toolbar display, consequently, will contain a special control used to access the drop-off well display associated with each toolbar display. Method 600 provides a method to expand and reduce the size of each of the toolbar displays sharing display area based on control usage.

Method 600 begins at the START step 605. The application displaying the toolbar displays has already been executed and two toolbar displays, which share the same display area, are displayed. Each of the toolbar displays contain a display area containing controls and is associated with a drop-off well display containing controls not capable of being displayed in the toolbar display. Proceeding to step 610, a control is selected from a drop-off well display in the first toolbar display. The selected control is accessed via the first toolbar display through the special control contained in the first toolbar display. Following the selection of the control, method 600 proceeds to step 615.

At step 615, the Most Recently Used parameters for the controls are updated for those controls accessed via the first toolbar display. These Most Recently Used parameters may be updated using the algorithm displayed in step 515 (see FIG. 5). The second toolbar display's control parameters are not modified. In this embodiment, the Most Recently Used parameters are utilized to determine which controls to display. However, one skilled in the art will recognize that any usage parameter or combination of parameters may be used, such as a Most Often Used parameter measuring how many times a control is used or a ranking system using the Most Recently Used and Most Often Used parameters.

At step 620, the first toolbar display is expanded to accommodate the selected control. In the case where selected control was located in the drop-off well display and the toolbar display is based on Most Recently Used parameters, the selected control must be placed up into the toolbar display because it is the most recently used control. To place the selected control in the first toolbar display, the proportion of display area the first toolbar display shares with the second toolbar display is increased by expanding the first toolbar display. At step 625, the selected control is added to the first toolbar display. Again, it is preferred that the selected control be placed in the first toolbar display in a predefined relational order.

Proceeding to step 630, the size of the second toolbar display is decreased so that the first toolbar display and the second toolbar display do not overlap. Because the first toolbar display is increasing in size to accommodate the selected control, the second toolbar display must decrease in size so that the first toolbar display does not overwrite the second toolbar display. The second toolbar display is decreased size the same amount that the first toolbar display is increased.

At step 635, the controls to be displayed in the second toolbar display are selected. In this embodiment, the controls to be displayed are selected by the Most Recently Used parameter associated with each control to be accessed via the second toolbar display. Those controls that are the most recently used and fit within the reduced size of the second toolbar display are selected.

It is preferred that the Most Recently Used parameters for the controls associated with each toolbar display are evaluated independently. For example, if a user continues to use controls from the first toolbar display's associated drop-off well display so it that it keeps expanding, the first toolbar display may have eight controls having Most Recently Used parameter values from 1 to 8. Whereas the second toolbar display, because of being reduced by the expanding first toolbar display, may only have three controls having Most Recently Used parameter values from 1 to 3. When the user selects another control from the first toolbar display's associated drop-off well display, it is preferred that the first toolbar display still be expanded, resulting in the addition of a control to the first toolbar display (thereby having Most Recently Used parameter values from 1 to 9) and reducing the second toolbars display to only two controls (having Most Recently used values from 1 to 2). From a usability standpoint, it is preferable to grow the first toolbar display, even though it removes a control having a lower Most Recently Used parameter values, off the second toolbar display while keeping controls having higher Most Recently Used parameter value, in the first toolbar display. Evaluating the toolbar displays independently, as such, provides for a more user-friendly display. Proceeding to step 640, the selected controls for the second toolbar display are displayed in the second toolbar display. Method 600 then stops at step 645.

Method 600 similarly works when controls from the second toolbar display's associated drop-off well display are selected, requiring that the second toolbar display be expanded and the first toolbar display to be reduced based on the Most Recently Used parameters. In this fashion, the first and second toolbar displays will expand and reduce in size, dynamically, as the user selects controls from either one of the toolbar displays, where the toolbar displays are always displaying the their most recently used controls. This allows for the user to have displayed, for easy access, all the controls that the user has used most recently.

In addition, one embodiment of the present invention provides for the prioritizing of controls in the toolbar displays. Having a priority on a control is beneficial when a control is so important that the toolbar display should never be allowed to get so small as to not allow the control of a given priority to be displayed. For example, if a Print control is given priority 1, and priority 1 controls are defined to always be displayed, the toolbar display containing the Print control would never be allowed to be reduced to a size so small as to prevent the display of the Print control. This priority scheme prevents users from inadvertently reducing the size of the toolbar displays so much as to remove what could be defined as an important command that should be displayed at all times.

In summary, the present invention is directed towards a method of displaying controls of a toolbar in a corresponding toolbar display based on the user's usage of the controls. A drop-off well display is typically associated with the toolbar display and contains those controls that cannot be displayed in the toolbar display. The drop-off well display can be accessed through a special control contained in the toolbar display. For one aspect, a Most Recently Used parameter is associated with all the controls accessed via the toolbar display. The value of the Most Recently Used parameter is determined by the user's selection of the controls. For example, the Most Recently Used parameter can be used to determine which controls to display in the toolbar display and which controls to display in the drop-off well display.

When the user selects a control from the drop-off well display, the Most Recently Used parameter associated with the selected control is updated to indicate that it is the control that has been used most recently. An attempt is then made to expand to incorporate the selected control within the toolbar display. If the toolbar display can be expanded, then the selected control is added to the toolbar display and placed in the toolbar displayed in a predefined relational order. If the toolbar display cannot be expanded, a determination is made for which controls to display in the toolbar display. This calculation is typically based on an accumulation of the space required to display the most recently used control, then the next most recently used control, and progressing to the least recently used control. Therefore, only those most recently used controls are typically displayed in the toolbar display, whereas the remaining controls are typically placed in the drop-off well display.

Although the exemplary embodiments of the present invention have been described with respect to a conventional GUI element, namely a toolbar and its associated control items, those skilled in the art will appreciate that the present invention also encompasses other GUI elements associated with control or command items. For example, the present invention also encompasses the dynamic alteration of the presentation of control items for alternative GUI elements, such as a rectangular palette, a dialogue box, or any portion of a GUI for presenting a set of control items or commands.

For an aspect of the present invention, the usage of control items for a toolbar can affect the presentation of the control items in the corresponding toolbar display. Those skilled in the art will appreciate that this inventive concept can be extended for a GUI environment having multiple GUI elements, such as a set of toolbar displays. For example, an alternative aspect of the present invention supports the dynamic control of the presentation of multiple GUI elements based on usage of the control items or commands for one or more of these GUI elements. Usage of a control item for a corresponding toolbar can affect the priority and usage parameters for that control item, thereby resulting in a change in the presentation of the corresponding toolbar display and one or more of the remaining toolbar displays. For the representative example, the priority/usage parameters for all control items of the toolbars in this GUI environment can be compared and, in response, the presentation of the toolbar displays can be resized based on the results of this comparison operation. In view of the foregoing, it will be appreciated that the present invention encompasses controlling the presentation of multiple GUI elements based on the usage of the control items for one or more of these GUI elements.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for dynamically displaying controls of a toolbar in a toolbar display of a program module, comprising the steps of:
   in response to a selection of a special control on the toolbar, displaying non-selected controls in a drop-off well display;
   receiving the selection of one of the non-selected controls displayed in the drop-off well display;
   executing a command associated with the selected control; and
   modifying a usage parameter associated with the selected control so that the selected control is displayed
   in the toolbar display and is no longer displayed in the drop-off well.

2. The method of claim 1 further comprising the step of expanding the toolbar display to accommodate presentation of the selected control.

3. The method of claim 1 further comprising the step of determining certain ones of the controls to display in the toolbar display based on a usage parameter maintained for each of the controls.

4. The method of claim 2 further comprising the step of displaying certain ones of the controls in the toolbar display according to a predefined relational order.

5. The method of claim 1, wherein the toolbar display includes a slide control operative to modify the size of the toolbar display, further comprising the steps of:
   adjusting the toolbar display size in response to receiving toolbar display size data from the slide control; and
   displaying certain ones of the controls in the toolbar display that can be accommodated based on the adjusted toolbar display size of the adjusted toolbar display.

6. A method for dynamically displaying selected ones of controls of a toolbar in a toolbar display and remaining non-selected controls in a drop-off well display, the toolbar display including a special control operative to display the non-selected controls in the drop-off well display, comprising the steps of:
   displaying the non-selected controls in the drop-off well display in response to an indication of selection of the special control;
   receiving an indication of assigning focus to a certain one of the non-selected controls in the drop-off well display;
   executing a command associated with the certain non-selected control; and
   displaying the selected controls and the certain non-selected control in the toolbar display.

7. The method of claim 6 further comprising the step of expanding the toolbar display to accommodate the presentation of the certain non-selected control.

8. The method of claim 6 further comprising the step of displaying an arrangement of the selected controls and the certain non-selected control in the toolbar display according to a predefined relational order.

9. The method of claim 6 further comprising the steps of:
   providing a slide control operative to modify the size of the toolbar display;
   adjusting the size of the toolbar display in response to receiving size data from the slide control; and
   displaying the selected controls and a subset of the non-selected controls, including the certain non-selected control, in the toolbar display that can be accommodated by the adjusted toolbar display size of the toolbar display.

10. A method of dynamically adjusting the size of a toolbar display, comprising the steps of:
    providing a toolbar display including controls and a special control operative to display controls in a drop-off well display;
    displaying the controls in the drop-off well display in response to a user selecting the special control;
    selecting one of controls in the drop-off well display;
    expanding the toolbar display size to accommodate the selected control; and
    displaying controls contained in the toolbar display and the selected control in a predefined relational order in the toolbar display.

11. The method of claim 10 further comprising the steps of:
    adjusting the toolbar display size in response to receiving toolbar display size data; and
    displaying controls in the toolbar display that can be accommodated in the adjusted toolbar display.

12. A method for dynamically allocating display space between a first toolbar display and a second toolbar display, wherein a portion of the first toolbar display and a portion of the second toolbar display share access to the same display area, comprising the steps of:
    expanding the first toolbar display into the display area of the second toolbar display;
    in response to the expansion of the first toolbar display, reducing the size of the second toolbar display so that the first toolbar display and the second toolbar display do not overlap display area; and
    displaying controls in the first toolbar display and the second toolbar display based on usage of the controls.

13. The method of claim 12, wherein the first toolbar display is expanded in response to adjusting the first toolbar display size by selecting a slide control.

14. The method of claim 12 further comprising the steps of:
    expanding the second toolbar display into the display area of the first toolbar display; and
    in response to expanding the second toolbar display, reducing the size of first toolbar display so that the first toolbar display and the second toolbar display do not overlap display area,
    displaying controls in the first toolbar display and the second toolbar display based on usage of the controls.

15. A method for dynamically displaying selected ones of a plurality of controls of a toolbar for a program module in a corresponding toolbar display, comprising the steps of:
    determining the amount of display area allocated to the toolbar display;
    monitoring usage of the selected controls displayed by the toolbar display and the remaining non-selected controls of the toolbar displayed in another display element;
    identifying controls to display in the toolbar display based on the allocated toolbar display area, the usage of the selected controls displayed in the toolbar display and the usage of the non-selected controls displayed in the display element; and
    modifying the toolbar display by displaying the identified controls in the toolbar display.

16. The method of claim 15, wherein the step of monitoring the usage of the selected controls and the non-selected controls is performed by tracking the most recently used controls of the toolbar.

17. The method of claim 15, wherein the step of monitoring usage of the selected controls and the non-selected controls is performed by monitoring the number of times the controls of the toolbar have been selected for operation.

18. The method of claim 15 further comprising the steps of:
storing results of the usage monitoring; and
using the stored results in a subsequent session of the program module to display selected controls in the toolbar display and non-selected controls in the display element.

19. The method of claim 15, wherein the identified controls are displayed in the toolbar display in a predefined relational order.

20. The method of claim 15, wherein the step of identifying the selected controls to display in the toolbar display and the non-selected controls in the display element, comprises the steps of:
assigning a priority value to the selected controls displayed in the toolbar display and the non-selected controls in the display element; and
displaying the selected and non-selected controls having a priority value matching a predefined value in the toolbar display.

21. A computer readable medium having computer-executable instructions for performing the steps recited in claim 15.

22. A method for determining which controls to display in a first toolbar display, comprising the steps of:
associating a most recently used (MRU) value to each control, wherein the MRU value indicates how recently the associated control was selected in relation to the other controls;
receiving the selection of one of the controls contained in a drop-off well display;
modifying the MRU value associated with the selected control;
determining which controls to display in the first toolbar display based on the MRU values associated with the controls currently displayed in the first toolbar display and the drop-off well display;
modifying the first toolbar display by displaying the determined controls in the first toolbar display.

23. The method of claim 22, wherein the determined controls are displayed in the first toolbar display in a predefined relational order.

24. The method of claim 22, wherein the first toolbar display is expanded to accommodate the size of the selected control.

25. The method of claim 24 further comprising the step of reducing the size of a second toolbar display so that the first toolbar display and the second toolbar display do not overlap.

26. The method of claim 25, further comprising the steps of:
determining controls to display in the reduced second toolbar display, wherein the determination is based on MRU values associated with controls displayed in the second toolbar display and a second drop-off well; and
displaying the determined controls in the reduced second toolbar display.

27. A method for dynamically displaying controls of a Graphical User Interface (GUI) element in a primary GUI element display for displaying certain ones of the controls, comprising the steps of:
receiving an indication of selection of one of the controls from a secondary GUI element display that is accessed via a special control on the primary GUI element display;
updating a usage parameter associated with the selected control and any other control displayed in the primary GUI element display;
displaying the selected control in the primary GUI element display; and
displaying a second selected control in the primary GUI element display in the event that the usage parameter for the second selected control is below a usage parameter threshold.

28. The method of claim 27 further comprising the step of expanding the primary GUI element display to accommodate presentation of the selected control within the primary GUI element display.

* * * * *